United States Patent [19]
Prince et al.

[11] Patent Number: 6,083,601
[45] Date of Patent: *Jul. 4, 2000

[54] FOAM WOOD EXTRUSION PRODUCT

[75] Inventors: Kendall W. Prince; Gordon L. King, both of Mesa, Ariz.

[73] Assignee: Royal Wood, Inc., Phoenix, Ariz.

[*] Notice: This patent issued on a continued prosecution application filed under 37 CFR 1.53(d), and is subject to the twenty year patent term provisions of 35 U.S.C. 154(a)(2).

[21] Appl. No.: 08/821,188

[22] Filed: Mar. 19, 1997

[51] Int. Cl.⁷ ...................................... E06B 9/26
[52] U.S. Cl. .................... 428/71; 160/236; 428/304.4
[58] Field of Search ................ 264/45.9; 428/304.4, 428/71; 160/236

[56] References Cited

U.S. PATENT DOCUMENTS

| | | |
|---|---|---|
| 2,068,977 | 1/1937 | Dodge . |
| 2,229,225 | 1/1941 | Schneider . |
| 2,748,048 | 5/1956 | Russell . |
| 4,519,435 | 5/1985 | Stier . |
| 4,687,793 | 8/1987 | Motegi et al. ........................ 523/200 |
| 4,818,590 | 4/1989 | Prince . |
| 4,942,084 | 7/1990 | Prince ..................................... 428/284 |
| 5,102,598 | 4/1992 | Chen ....................................... 264/140 |
| 5,119,871 | 6/1992 | Schwaegerle . |
| 5,121,785 | 6/1992 | Ohsumi . |
| 5,201,355 | 4/1993 | Nien ........................................ 160/236 |
| 5,254,622 | 10/1993 | Nanasawa et al. ..................... 525/800 |
| 5,273,781 | 12/1993 | Shu . |
| 5,496,630 | 3/1996 | Hawrylko et al. ....................... 428/328 |
| 5,736,209 | 4/1998 | Andersen et al. ................... 428/317.9 |
| 5,996,672 | 12/1999 | Kotin ....................................... 160/236 |

*Primary Examiner*—Allan R. Kuhns
*Attorney, Agent, or Firm*—Rader, Fishman & Grauer PLLC

[57] ABSTRACT

An extruded product having a foam core is formed by blending powdered cellulose with a base resin and an oxidizer to yield a first mixture. The first mixture is compressed, heated and extruded to form a pelletized compound which is compressed and heated into a homogeneous extrudable mixture. Moisture is extracted from the powdered cellulose at one or more points during the process to achieve a moisture content of less than about two percent. A protective cladding is coaxially extruded around a core of the extrudable mixture to form an elongated product having a foam core at least partially enclosed by the protective cladding.

2 Claims, 2 Drawing Sheets

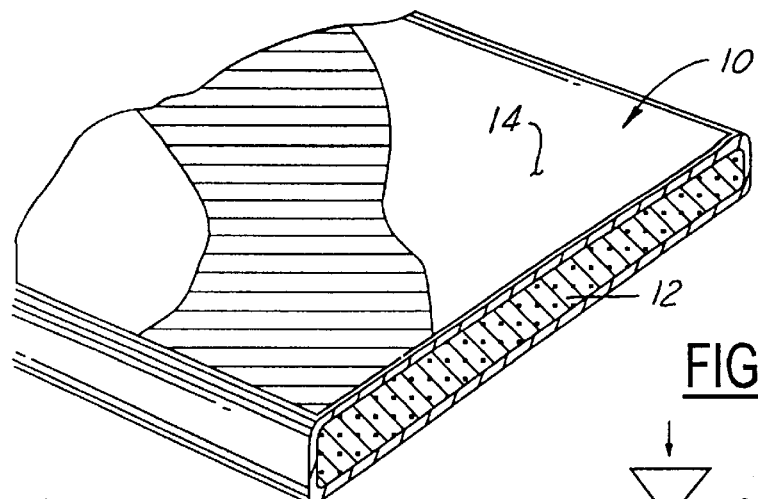
FIG.1
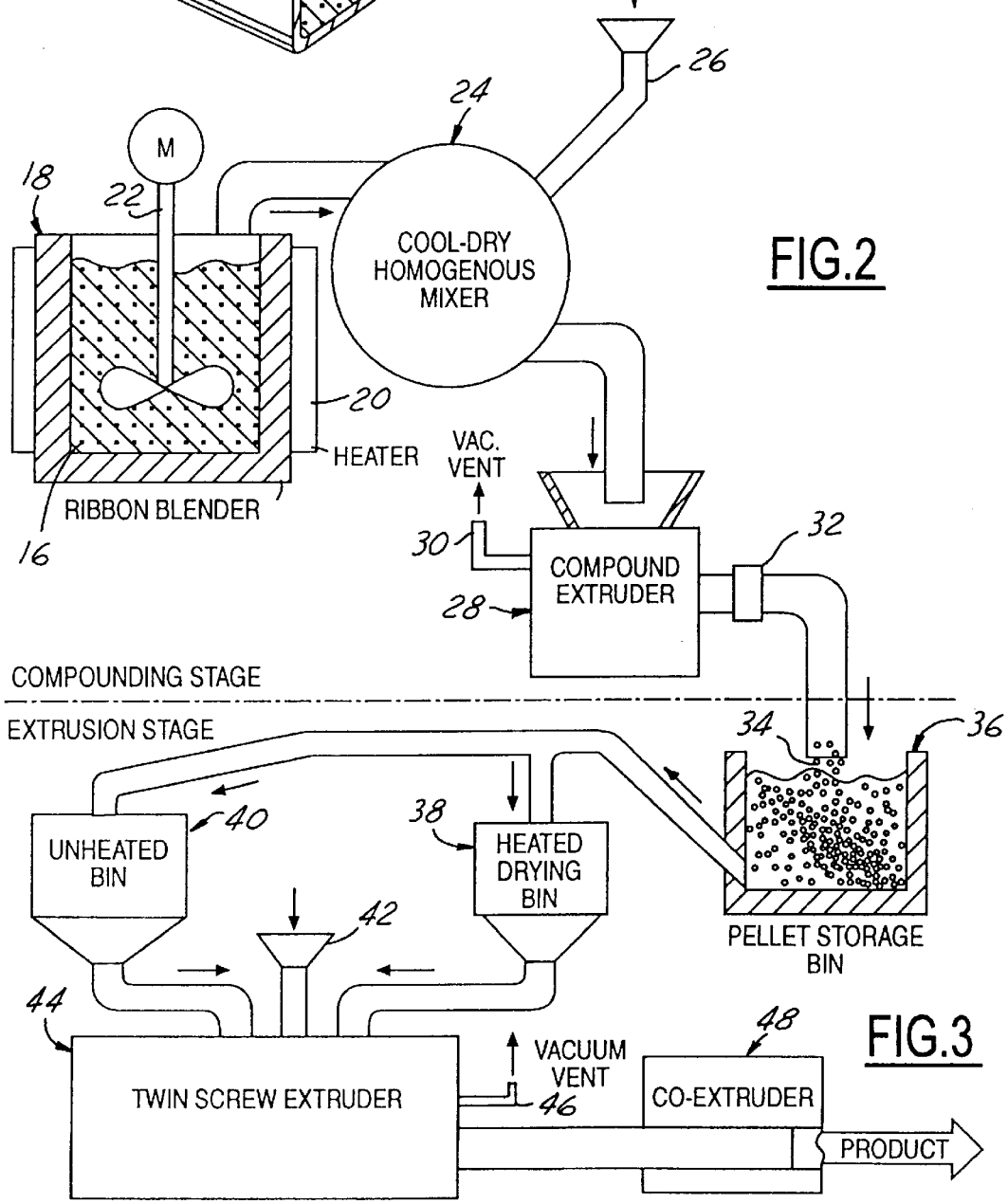
FIG.2
FIG.3

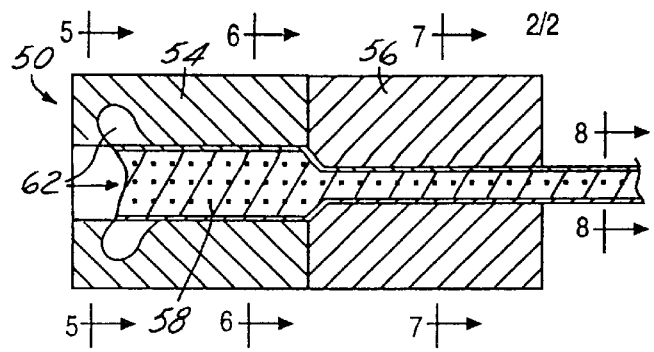
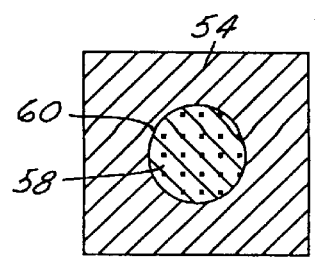
FIG. 5
FIG. 4
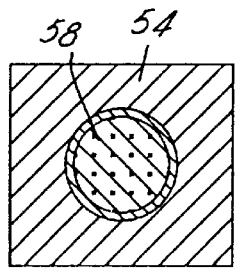
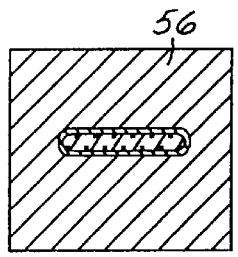
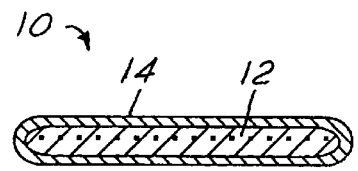
FIG. 6     FIG. 7     FIG. 8
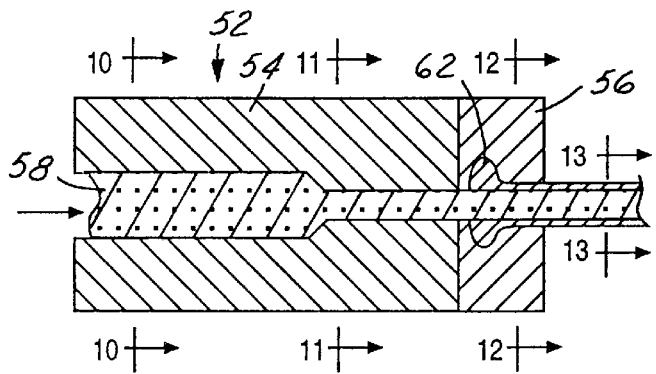
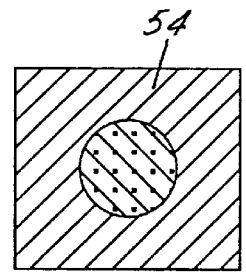
FIG. 10
FIG. 9
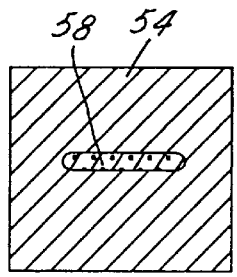
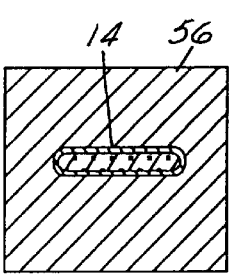
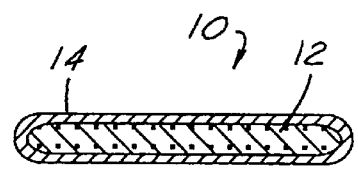
FIG. 11     FIG. 12     FIG. 13

FOAM WOOD EXTRUSION PRODUCT

FIELD OF THE INVENTION

This invention relates to an extruded product having a foam core consisting of a significant percentage of powdered cellulose.

DESCRIPTION OF THE PRIOR ART

Consumers prefer wooden window blind slats because wooden slats are light in weight, high in strength and do not significantly bend or decompose upon prolonged exposure to sunlight. Although in great demand, wooden window slats because of their high cost do not represent an affordable alternative for most consumers.

The prior art has attempted to provide a low cost substitute for wooden window blind slats. U.S. Pat. No. 2,229,225 (Schneider) discloses window blind slats fabricated from cellulose acetate or other organic derivatives of cellulose material. Schneider discloses that his preferred cellulose acetate slats can be prepared by cutting cellulose acetate from sheet stock of an appropriate thickness into the desired contour and size. Alternatively, Schneider discloses that the cellulose acetate slats may be prepared by hydraulically extruding a cellulose acetate composition, containing from ten to fifteen percent solvent, in a powder press under appropriate temperature and pressure conditions. The extrusion procedure is described as a low cost technique for producing an inexpensive core or base upon which is laminated a higher grade facing of veneer during a subsequent molding operation. Schneider further discloses that the cellulose acetate preferably contains a plasticizer to impart necessary molding and shaping properties, with the weight percentage of the plasticizer varying from twenty percent to fifty percent of the weight of the cellulose acetate. In FIG. 1, Schneider discloses that an outer cover 15 may be extruded around the core or base 14, which may be fabricated from wood, metal or a cellulose acetate composition. Schneider further teaches that the cellulose acetate material may be replaced by other organic derivatives of cellulose such as organic esters of cellulose and cellulose ethers. The resulting product, however, is heavier than wood.

U.S. Pat. No. 2,748,048 (Russell) discloses a plastic structural member comprising a laminate of plastic material bonded together along its longitudinal edges and provided with a longitudinally extending pocket in its central area together with a reinforcing member positioned lengthwise in the pockets to separate the center portions.

U.S. Pat. No. 4,519,435 (Stier) discloses slats for vertical venetian blinds fabricated from strips of textile material having both a backing and a facing.

U.S. Pat. No. 4,818,590 (Prince) discloses a wood veneer-covered structural rigid plastic foam element fabricated from a rigid plastic foam substrate with opposing wood veneer surfaces adhesively secured to at least one of the foam substrate surfaces.

U.S. Pat. No. 5,121,785 (Ohsumi) discloses a venetian blind slat fabricated from a core plate made from metal, FRP or wood with a pair of surface layers laminated on both faces of the core plate.

U.S. Pat. No. 5,273,781 (Shu) discloses a method of making blind fabric material for venetian and vertical blinds, including the steps of dipping the base material in a solution of thermoplastic resin, thermosetting resin and polyvinyl resin and thereafter passing the fabric through a roller and performing additional method steps to yield the desired blind slat.

SUMMARY OF THE INVENTION

It is therefore a primary object of the present invention to provide a process for forming an extruded product having a foam core surrounded and at least partially enclosed by a protective cladding having weight, strength and rigidity characteristics comparable to the characteristics of similarly dimensioned wooden products.

Another object of the present invention is to provide a process for forming an extruded product having a foam core surrounded and at least partially enclosed by a protective cladding which will perform comparably to wood when exposed for extended periods to heat and sunshine.

Yet another object of the present invention is to provide a process for forming an extruded product having a foam core surrounded and at least partially enclosed by a protective cladding having flexural strength characteristics characterized as semi-rigid or near-rigid, comparable to those of a similarly dimensioned wooden sheet material.

Still another object of the present invention is to provide a process for forming an extruded product having a foam core surrounded and at least partially enclosed by a protective cladding wherein the foam core includes a substantial percentage of powdered cellulose procured from low cost sources such as sawdust, peanut hulls, walnut hulls or straw.

Briefly stated, in one embodiment of the invention, an extruded product includes a foam core surrounded and fully enclosed by a protective cladding. The extruded product is formed by blending powdered cellulose with a base resin, a coupling agent, a fatty acid and an oxidizer to yield a first mixture. The first mixture is compressed, heated and extruded to form a pelletized and extrudable compound. Moisture is extracted from the powdered cellulose at one or more points during the process, to ensure that the ultimate moisture content of the extruded product will be less than about two percent, preferably about one percent. A thermoplastic protective cladding is coaxially extruded around a core of the extrudable mixture to form the elongated product having a foam core fully enclosed by the protective cladding. The preferred cellulose content of the final product is about 12%, this concentrate providing a desirable combination of strength, density and cost.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

FIG. 1 represents a partially cutaway perspective view of an extruded product having a foam core surrounded and fully enclosed by a protective cladding.

FIG. 2 schematically illustrates the structures involved in implementing the initial steps of the present invention directed to the product compounding stage.

FIG. 3 schematically illustrates the structures involved in implementing the subsequent steps of the present invention directed to extruding the final product.

FIG. 4 represents a sectional view of the co-extrusion die for extruding the thermoplastic protective cladding around a core of the extrudable mixture.

FIG. 5 represents a sectional view of the co-extrusion die illustrated in FIG. 4, taken along section lines 5—5.

FIG. 6 represents a sectional view of the co-extrusion die illustrated in FIG. 4, taken along section lines 6—6.

FIG. 7 represents a sectional view of the co-extrusion die illustrated in FIG. 4 taken along section lines 7—7.

FIG. 8 represents a sectional view of the extruded product having a foam core surrounded and fully enclosed by a protective cladding as illustrated in FIG. 4, taken along section lines 8—8.

FIG. 9 represents a sectional view of an extrusion element and a cap die illustrating the coaxial extruding step which forms a protective thermoplastic cladding around a core of extrudable mixture after the extrudable mixture has been extruded into a predetermined shape.

FIG. 10 represents a sectional view of the structure illustrated in FIG. 9, taken along section lines 10—10.

FIG. 11 represents a sectional view of the structure illustrated in FIG. 9, taken along section lines 11—11.

FIG. 12 represents a sectional view of the structure illustrated in FIG. 9, taken along section lines 12—12.

FIG. 13 represents a cross sectional view of the extruded product having a foam core surrounded and fully enclosed by a protective cladding illustrated in FIG. 9, taken along section line 13—13.

DETAILED DESCRIPTION OF THE PREFERRED EMBODIMENTS

In order to better illustrate the advantages of the invention and its contributions to the art, a preferred hardware embodiment of the invention will now be described in some detail.

FIG. 1, illustrates a window blind slat 10 formed as an extruded product having a foam core 12 surrounded and fully enclosed by a thermoplastic protective cladding 14. FIGS. 2 and 3 schematically illustrate the preferred structural components for implementing the process of the present invention.

The process begins with the procurement of powdered cellulose having a relatively small particle size. Powdered cellulose can be procured as fine particle size sawdust, commonly referred to as wood flour, or as finely ground peanut hulls, walnut hulls, cotton or straw.

Although optimum results are achieved with powdered cellulose having a fine, small particle size, larger particle sizes are fully compatible with the process, as long as the maximum particle dimension is less than the minimum dimension of the extruded product. For the slat illustrated in FIG. 1, the maximum particle size must be less than the height of the foam core element 12. To implement the highest performance embodiment, very fine, powder-like particle sizes are preferred to maximize the uniformity of the foam core element, creating an appearance (when viewed along the cross section of foam core 12) relatively comparable to that of a wooden slat. Utilization of small particle size powdered cellulose significantly facilitates reduction of the powdered cellulose moisture content during various stages of the process.

The moisture content of the powdered cellulose element represents one of the most critical parameters. The moisture content of the foam core of the final extruded sheet material is preferably reduced to a level of less than about two percent, preferably about one percent, but not substantially less than about 0.5 percent. When a near zero moisture content is approached, the foam will not expand to its intended size and shape. When the moisture content of the final product exceeds about two percent, the properties of the final extruded product are substantially modified. For example, steam pockets are generated, thereby destroying the aesthetics of the final product.

A variety of methods may be implemented to achieve the desired moisture content. Preferably, the powdered cellulose component can be procured with a moisture content not exceeding seven to nine percent. The present invention works very acceptably when the powdered cellulose initially contains either a higher or lower moisture content, but the process can be implemented most efficiently and most cost effectively when the moisture content of the powdered cellulose component does not exceed seven to nine percent.

In FIG. 2, the powdered cellulose material 16 is first placed within ribbon blender 18, which is surrounded by heating element 20 and which further includes motor driven mixer 22 for mixing and circulating powdered cellulose 16 to improve the uniformity of heating and to facilitate removal of moisture.

In one implementation of the process of the present invention, blender 18 is operated for a time adequate to reduce the moisture content of powdered cellulose 16 to a level of from about two percent to about four percent.

As illustrated in FIG. 2, the partially dried, powdered cellulose 16 is transferred from blender 18 to mixer 24, which is referred to in the art as a cool-dry homogeneous mixer. In mixer 24, various other chemical components are added through input port 26 to blend the components into a relatively homogeneous mixture.

The table below identifies the various components which are blended together within mixer 24, their typical component concentration ranges, the specifications for the preferred formulation and the identity of the specifically preferred components:

TABLE 1

| COMPONENT CONCENTRATION RANGES BY WEIGHT | PREFERRED % BY WEIGHT | GENERIC COMPONENT IDENTIFIER |
| --- | --- | --- |
| 1–40% | 25% | powdered cellulose |
| 5–60% | 25% | base resin |
| .01–3% | .03% | coupling agent or process aid |
| .01–2% | .2% | fatty acid |
| .01–2% | .2% | oxidizer |
| As required to yield 100% | Approximately 49.6% | thermoplastic resin |

The powdered cellulose is preferably sawdust (wood flour) having a moisture content of 2–4%.

The base resin is preferably ABS (acrylonitrile butadiene styrene).

The coupling agent or process aid component performs the function of increasing the compatibility of the cellulose and resin components to enhance the homogeneity of the final product. The preferred composition is a blend of fatty acid, metal soap, amide, and ethyl bis-stearamide.

The fatty acid component typically takes the form of stearic acid, although any equivalent fatty acid or animal fat, commonly referred to as tallow, could be readily substituted for stearic acid. The fatty acid component can be entirely eliminated, although when present it facilitates the blending of the cellulose with the plastic components.

The oxidizer functions to stabilize the resin. A preferred composition is Bis (2,4-D1-T-butylphenol pentaerythrtol diphosphite.

The thermoplastic resin component is selected from either polyvinyl chloride (PVC), acrylonitrile butadiene styrene (ABS), or styrene acrylonitrile (SAN) or a combination thereof SAN is presently preferred. It can be supplied either in powder or pellet form or as a blend of the two forms. The particular physical form is typically selected on the basis of lowest cost, because no significant performance difference between the forms has been observed. The weight percentage concentration of the thermoplastic material is determined in response to the weight percentage concentrations of the other components so that the overall formulation yields a one hundred percent weight concentration.

FIG. 2 further illustrates that the blended output from mixer 24 is transferred into compounding extruder 28. The extruding zones and the dies zones within extruder 28 in the preferred embodiment are heated to a temperature of about 370°. The output flow rate of mixer 24 is coordinated with the operating speed of extruder 28 in a manner well known to those skilled in the art.

Vacuum port 30 is typically operated with a vacuum level of about twenty-three to twenty-five inches of mercury and functions to extract additional moisture from the compressed, heated and extruded mixture. Vacuum port 30 assists in reducing the moisture content of the mixture to the two percent maximum moisture content objective. The amount of moisture actually extracted through vacuum vent 30 varies as a function of process speed. The slower the process speed, the greater the degree of control and ability available to achieve the ultimately desired product moisture content.

The output from extruder 28 is fed to a conventional pelletizer 32. A Barrington underwater pelletizer has been found highly effective for this purpose. The pellets 34 discharged into pellet storage bin 36 typically have a diameter of approximately one eighth inch and a length of about one quarter inch, with a preferred moisture content of about one to two percent by weight.

As illustrated in FIG. 3, the output of pellet storage bin 36 is transferred to both a heated drying bin 38 and an unheated bin 40. Heated bin 38 is maintained at a temperature of about 200° F., with a controlled dew point of about −40° F. The outputs of drying bins 38 and 40 are metered through associated variable ratio mixers (not illustrated). The mixers are controlled either by an operator or by automatic process flow control equipment (using appropriate feedback inputs) to transfer an appropriate percentage (further explained below) of dried and undried pellets 34 to twin screw extruder 44.

Additional ingredients are added in pellet form, via input port 42, to extruder 44. Using the previously listed preferred ingredients, these pellets have a preferred composition of 40% base resin, 0.03% coupling agent, 0.2% fatty acid, 0.2% oxidizer, and, as the balance, one or more of the previously listed thermoplastic resins. These pellets are metered through a variable ratio mixer to achieve a overall combined concentration in the finished, extruded product of about 1% to 40% cellulose, preferably about 10% to 15%, with the presently preferred concentration of cellulose being about 12%. These additional pellets are prepared using processes and equipment similar to that described above respective pellets 34.

Foaming agent in metered quantities of at least about 0.05% but less than 3% of the total charge to extruder 44 is also added via inlet port 42 or a similar port. The foaming agent, also commonly referred to as a blowing agent, performs the important function of allowing the heated, extruded material to expand while maintained in a heated state to fully occupy the predetermined, desired product profile. The preferred foaming agent, LEBA-50D, manufactured by Phoenix Coloring of Sandusky, Ohio, typically includes a mixture of both endothermic and exothermic foaming agent components. While the foaming agent can be formulated to have either a one hundred percent endothermic component or a one hundred percent exothermic component, the preferred foaming agent blend includes approximately an eighty percent endothermic component with a twenty percent exothermic component. The exothermic foaming agent is more efficient and provides greater expansion than does an equal quantity of endothermic foaming agent component, but excessive quantities prolong the duration of the expansion and result in loss of control of the process and the resulting parts. The foaming agent concentration may be varied as appropriate to achieve the desired product profile.

Pellets 34 and the foaming agent are hygroscopic ingredients, and it is therefore desirable to initially form pellets 34 with a very low moisture content. However, atmospheric conditions will cause these ingredients to introduce varying quantities of moisture to extruder 44. It is therefore the function of the dual-source pellet bins 38, 40 and their associated metering devices to provide a continuously controllable means for varying the blend of pellets to achieve the approximately 1% moisture content which is believed to be optimum for maximum product quality. Departures from desired product quality can often be eliminated by adjustments in the blend from these two sources.

In implementing the preferred process, applicants have used a Cincinnati Milacron conical twin screw extruder 44 fitted with a vacuum port 46 and a co-extruder 48. Vacuum port 46 is operated at a vacuum level of about twenty-three to twenty-five inches of mercury and aids in maintaining the moisture content of the extruded product at the desired low level.

Co-extruder 48 includes both an extruder, such as a Davis standard single screw extruder, and an extruder die, such as co-extruder die 50 illustrated in FIG. 4 or co-extruder die 52 as illustrated in FIG. 9.

In co-extruder 48, the Davis standard single screw extruder is divided into three barrel zones, while the co-extrusion dies illustrated in FIGS. 4 and 9 are typically divided into five die zones.

Presently preferred extrusion temperatures for co-extruder 48 are as follow: barrel zones 1, 2 and 3 are set at 330, 340 and 360 degrees Fahrenheit, respectively; die zone 1 is set at 370 degrees, and die zones 2 through 5 are each set at 350 degrees. As much as 10% variations in those preferred temperatures can be employed. For example, these temperatures may be increased slightly in winter to compensate for colder materials.

FIGS. 4–6 illustrate a first and preferred embodiment of the co-extrusion process where the extrudable mixture provided by extruder 44 is co-extruded with an appropriate thermoplastic cladding or coating material within a first element of co-extruder die 50, while the second element of co-extruder die 50 shapes the material into the desired geometric configuration. In the alternative embodiment illustrated in FIGS. 9–13, appropriate die shapes are provided to shape the extruded material into the desired form prior to co-extruding the thermoplastic cladding layer around the resulting foam core.

In the preferred embodiment of the invention, the average temperature of co-extrusion dies 50 and 52 is maintained at 300° F., but the entry, intermediate and exit zones are preferably maintained at 290, 300 and 310 degrees Fahrenheit, respectively.

Referring to FIGS. 4–8, co-extrusion die 50 includes a first extrusion element 54 and a second extrusion element 56. In first extrusion element 54, the extruded foam core material 58 received from extruder 44 passes through cylindrical passageway 60 (as illustrated in FIG. 5) such that the circumference of material 58 passes ring-shaped cavity 62 which receives, stores and co-extrudes a thermoplastic material around the entire circumference of extruded foam core 58 (as specifically illustrated in FIG. 6).

In the FIG. 4 embodiment, the bore of the first extrusion element 54 transitions from a cylindrical cross sectional configuration (as illustrated in FIG. 6) to an oval or slat-shaped configuration (as illustrated in FIG. 7) in second extrusion element 56. The output from second extrusion element 56 possesses the desired final product configuration, in the present case an oval-shaped extruded product compatible for use as slats for window blinds. The continuous product fed from the output port of co-extrusion die 50 is cut to appropriate lengths in response to customer requirements.

The thermoplastic material co-extruded from ring shaped cavity 62 may be formulated to be ultraviolet (UV) stable, without subsequent painting to prevent yellowing or change of color when exposed to sunlight for long periods of time. In certain applications, it may be desirable to add pigment to the thermoplastic material to avoid the necessity for painting the exposed surface of the thermoplastic cladding material. Other applications may make painting desirable, and appropriate formulation changes would be made. A wide range of thermoplastic materials are suitable for use as cladding material 14, including PVC, ABS and polycarbonate. Numerous alternative thermoplastic materials are well known to persons of ordinary skill in the art. A high grade material available from General Electric under the trademark GELOY plastic could also be used as a high grade exterior plastic cladding material.

The thickness of cladding material 14 can be controlled in a variety of ways, including varying the co-extrusion pressure as well as varying the speed of passage of the materials through co-extrusion die 50. Faster transit rates result in a thinner cladding material, while slower transit rates yield a thicker cladding material.

Referring now to FIGS. 9–13, and alternative embodiment of the invention is illustrated in which the co-extrusion step occurs after the shaping step has been implemented. As shown in those drawings, extruded foam core material 58 transitions from a cylindrical cross section (as illustrated at FIG. 10) at the entry side of first extrusion element 54 of co-extrusion die 50 to an oval-shaped slat configuration beginning at an intermediate portion of first extrusion element 54 (as illustrated in FIG. 11).

As illustrated in FIG. 9, co-extrusion die 52 includes ring-shaped cavity 62 in second extrusion element 56 which forms cladding 14 around the pre-formed oval-shaped slat configuration. FIG. 13 illustrates that the configuration of slat 10 formed by the alternative configuration co-extrusion die 52 is essentially identical in configuration to slat 10 (illustrated in FIG. 8) which was formed by a different sequence of steps within co-extruder die 50.

As a result of the action of the foaming agent, expansion of the extrudable mixture continues and is substantially complete within about three to four inches after discharge from the exit port of co-extrusion dies 50 or 52. As a function of both time and distance, the extrudable material will have expanded to the desired final product configuration by that point. At the point of desired expansion, slat 10 enters a conventional vacuum cooling and sizing or shape calibrating machine (not shown) and is drawn through a conventional calibrating profile to conform the cross sectional profile of slat 10 to the desired end product configuration. Within the calibration equipment, a vacuum of about sixteen to eighteen inches of mercury is applied while the slat is cooled by a shower or water held at a temperature of approximately 68° F. Upon completion of the sizing and cooling operation within the calibration equipment, the continuous length of slat is cut to the appropriate customer-specified length.

FIGS. 2 and 3 illustrates one structural embodiment capable or implementing the process of the present invention. Although a ribbon blender 18 has been illustrated as one device suitable for controllably reducing the moisture content of powdered cellulose 16, a paddle blender or a tumble dryer could be substituted for blender 18 to accomplish the same objective. In another embodiment, mixer 18 could be entirely eliminated and the moisture reducing and moisture controlling function of that device could be implemented by vacuum ports 30 and 46. In this alternative embodiment, the vacuum ports would be required to extract increased quantities of moisture, which may result in a slower flow rate for the process. The present invention could also be implemented by eliminating both blender 18 and vacuum port 30 and performing all moisture extraction at vacuum port 46. If powdered cellulose material 16 with a very low level moisture content of only two to four percent is available, blender 18 could be omitted and the moisture content control objective could readily be implemented by the vacuum ports.

It will be readily apparent to those skilled in the art that the disclosed foam wood extrusion product and process may be modified in numerous other ways and may assume many embodiments other than the preferred forms specifically set out and described above. Accordingly, it is intended by the appended claims to cover all such modifications of the invention which fall within the true spirit and scope of the inventions.

We claim:

1. A Venetian blind slat formed by the process of extruding a core of powdered cellulose and a foamed thermoplastic resin, wherein said core comprises between about 1 percent and 40 percent powdered cellulose by weight and about 2 percent or less water by weight, and said core is at least partially surrounded by a coextruded protective cladding of thermoplastic material.

2. The slat of claim 1, wherein the cellulose present in said core has a concentration of between about 10 percent and 15 percent by weight.

* * * * *

UNITED STATES PATENT AND TRADEMARK OFFICE
Certificate

Patent No. 6,083,601   .                                            Patented: July 4, 2000

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Kendall W. Prince, Mesa, AZ; Gordon L. King, Mesa, AZ; and Roderick E. Hughes, Newport Beach, CA.

Signed and Sealed this Thirtieth Day of April 2002.

<div align="right">
JAN H. SILBAUGH<br>
*Supervisory Patent Examiner*<br>
Art Unit 1732
</div>